Patented Mar. 29, 1949

2,465,952

UNITED STATES PATENT OFFICE 2,465,952

MANUFACTURE OF PARA-NITROBENZENE SULFONYL CHLORIDE

Michael Witte, Eden, and Morton G. Welge, Barker, N. Y., assignors to Allied Chemical & Dye Corporation, New York, N. Y., a corporation of New York No Drawing. Application June 7, 1946, Serial No. 675,295

13 Claims. (Cl. 260—543)

1

This invention relates to an improved process for the manufacture of para-nitrobenzene sulfonyl chloride from di-para-nitrophenyl disulfide.

This application is in part a continuation of our now abandoned United States patent application Serial No. 537,970, filed May 29, 1944, and entitled "Manufacture of para-nitrobenzene sulfonyl chloride."

Para-nitrobenzene sulfonyl chloride is an important intermediate in the preparation of drugs of the sulfanilamide series, which have attained of late years great importance in therapeutics.

It was known heretofore to prepare para-nitrobenzene sulfonyl chloride from di-para-nitrophenyl disulfide. (The latter intermediate can be obtained from para-nitro-chlorbenzene by reaction with sodium sulfide and sulfur in aqueous alcoholic solution, as disclosed by Bell in Journal of the Chemical Society (London), 1928, page 2776.) Thus, para-nitrobenzene sulfonyl chloride has been prepared by oxidizing di-para-nitrophenyl disulfide, for example, with fuming nitric acid, neutralizing the resulting acid with ammonium hydroxide (after filtering off insoluble material), and reacting the resulting ammonium salt in crystalline form with chlorsulfonic acid. This procedure, however, is relatively uneconomical because of the intermediate preparation of the sulfonic acid and its ammonium salt in the solid form, and the relatively large amount of chlorsulfonic acid required.

According to Zincke (Annalen, volume 400 (1913), page 10), para-nitrobenzene sulfonyl chloride can be readily obtained by treatment of di-para-nitrophenyl disulfide, suspended in glacial acetic acid, with moist chlorine. However, the yields obtained in this process are low.

It was also known heretofore to prepare ortho-nitrobenzene sulfonyl chloride by reaction of an acid suspension of the corresponding di-ortho-nitrophenyl disulfide with chlorine. Thus, according to Fierz (Helv. Chim. Acta, volume 12, (1929), page 667), when gaseous chlorine is passed into a suspension of di-ortho-nitrophenyl disulfide in a mixture of concentrated hydrochloric and nitric acids, ortho-nitrobenzene sulfonyl chloride is separated from the reaction mixture, and is recovered in a yield of 80% of theory upon recrystallization from glacial acetic acid. This procedure, however, does not produce similar results when applied to di-para-nitrophenyl disulfide; the yield of the para-isomer obtained by such a procedure amounts to less than 40% of theory.

We have now discovered that para-nitroben-

2 zene sulfonyl chloride can be economically produced in high yields directly from di-para-nitrophenyl disulfide by a simple process (which does not require preliminary conversion of di-para-nitrophenyl disulfide into para-nitrobenzene sulfonic acid) by reacting di-para-nitrophenyl disulfide with a reaction mixture containing nitric acid and chlorions, and a solvent which is liquid, substantially inert, and substantially immiscible with the acid mixture under the conditions of the reaction, and which is a solvent for para-nitrobenzene sulfonyl chloride and preferably is a non-solvent or relatively poor solvent for di-para-nitrophenyl disulfide.

The inert solvent may be one or more aromatic, naphthenic, paraffinic or olefinic compounds and is advantageously employed in a quantity such that little or no di-para-nitrophenyl disulfide is dissolved but all of the para-nitrobenzene sulfonyl chloride formed is dissolved. The minimum proportion of solvent to be employed is thus dependent upon the solubility of the sulfonyl chloride and varies for different solvents. Examples of solvents having the aforementioned properties and suitable for use in accordance with the invention are benzene, toluene, xylene, chlorobenzene, dichlorobenzene, nitrobenzene, paraffinic hydrocarbons containing 5 to 12 carbon atoms, for example, heptane, octane, iso-octane, nonane, ligroin, petroleum ether, straight run and catalytically originated naphthas, Stoddard solvent, and the like, and mixtures of two or more of such solvents. Liquid aromatic hydrocarbons of the benzene series, such as benzene, toluene, and xylene, are non-solvents for the disulfide and are especially good solvents for the para-nitrobenzene sulfonyl chloride, and are the preferred solvents of the invention. Quantities of the preferred solvents between 5 and 20 parts by weight for each 4 parts by weight of the disulfide are preferred.

The essential components of the aqueous phase of the reaction mixture employed in the conversion of di-para-nitrophenyl disulfide to para-nitrobenzene sulfonyl chloride are nitric acid, and chlorions. They may be added as such or generated in situ. Thus a mixture containing these components can be prepared by the reaction of nitrosyl chloride with water, or by mixing nitric acid and hydrochloric acid, or by adding chlorine to nitric acid. The second of these procedures constitutes the subject of an application Serial No. 675,294 of Michael Witte filed June 7, 1946, and entitled "Method of making para-nitrobenzene sulfonyl chloride."

A preferred reaction mixture (aqueous phase) is obtained by introducing gaseous chlorine into a mixture of nitric and hydrochloric acids. The proportions of the acid components are preferably at least 1 mol of HNO₃ and 5 mols of HCl per mol of di-para-nitrophenyl disulfide. The preferred proportions of these acids in the reaction mixture are about two and two-thirds mols of HNO₃ and about 14 mols of HCl, per mol of di-para-nitrophenyl disulfide. The acids are preferably used in concentrated form, i. e. the aggregate concentration of HNO₃ and HCl in the aqueous phase is preferably not less than 35% by weight. Gaseous chlorine is passed through the mixture more or less continuously throughout the reaction to maintain a chlorine concentration in excess of that obtainable by reaction of the two acids. This excess chlorine improves the yield and quality of the para-nitrobenzene sulfonyl chloride obtained by the process.

A reasonable excess of nitric acid, hydrochloric acid or solvent can be used without materially changing the course of the reaction; but such excess is preferably not employed for reasons of economy.

The conversion of di-para-nitrophenyl disulfide to para-nitrophenyl sulfonyl chloride, according to the process of the invention, is preferably effected at temperatures substantially within the range 25° C. to 100° C. At temperatures substantially lower than 25° C., the reaction is slow and requires too long a period to be economically and efficiently operated; at temperatures substantially above 100° C., decomposition of the reaction product and other side reactions are accelerated and act to decrease the yield of para-nitrobenzene sulfonyl chloride. Temperatures between 50° C. and 65° C. are especially preferred.

In a preferred embodiment of the invention involving the use of one of the preferred aromatic hydrocarbon solvents, para-nitrobenzene sulfonyl chloride is recovered by separating the non-aqueous liquid phase from the aqueous acid phase of the reaction mixture, and diluting the non-aqueous phase with a liquid paraffinic hydrocarbon (particularly, a relatively volatile liquid hydrocarbon mixture, such as a petroleum fraction boiling within the range 40° to 210° C.) to effect precipitation of the para-nitrobenzene sulfonyl chloride. The product can be recovered in crystalline form by cooling the diluted mixture and filtering out the crystalline product, and can be purified by recrystallizing the filter cake from an additional quantity of a paraffinic hydrocarbon.

Alternatively, the non-aqueous liquid phase of the reaction mixture can be concentrated, before dilution with the paraffinic hydrocarbon, by evaporation of part of the aromatic solvent therefrom; the crystalline product can be obtained after diluting the concentrated solution with a paraffinic hydrocarbon, by cooling and filtering; and the crystalline filter cake can be purified by extracting it with a paraffinic hydrocarbon at a temperature sufficient to maintain the para-nitrobenzene sulfonyl chloride in a molten state, in an apparatus adapted for solvent extraction of liquids. Upon cooling the extract, crystalline para-nitrobenzene sulfonyl chloride is precipitated and can be recovered by filtration in the form of a filter cake. The product thus obtained is free of any impurities precipitated by dilution of the concentrated non-aqueous liquid phase of the reaction mixture, which are insoluble in the paraffinic hydrocarbon.

As a further variation, the non-aqueous liquid phase of the reaction mixture can be evaporated so as to remove all of the inert aromatic compound, and to obtain crude para-nitrobenzene sulfonyl chloride in the form of a solid residue. The crude para-nitrobenzene sulfonyl chloride thus obtained can be recrystallized from a liquid paraffinic hydrocarbon of the type described above, or it can be subjected to extraction with a paraffinic hydrocarbon in the same manner as the product obtained by concentrating the non-aqueous liquid phase of the reaction mixture and diluting the concentrate with a paraffinic hydrocarbon, as hereinbefore described.

In each of these cases the quantity of paraffinic hydrocarbon is normally limited to avoid retention of excessive proportions of the reaction product in solution. This is also true of the aromatic solvent; thus a quantity sufficient to dissolve all the sulfonyl chloride is used but not a great excess such as would prevent subsequent precipitation.

When a paraffinic hydrocarbon oil is employed as product solvent in the reaction, the product may be recovered merely by cooling the non-aqueous phase, or by evaporating a portion of the solvent and then cooling, or by completely evaporating the solvent.

It has been found that the use of a solvent in the manner described above makes possible the recovery of substantially pure para-nitrobenzene sulfonyl chloride in yields which are generally more than twice the yields obtained in the absence of such solvent.

The invention will be more fully understood from the following illustrative examples, wherein temperatures are in degrees centigrade and parts and percentages are by weight unless otherwise expressed, one part by volume being an amount having the same volume as one part by weight of water.

EXAMPLE 1

*Part A.—Preparation of para-nitrobenzene sulfonyl chloride*

Crude di-para-nitrophenyl disulfide (398 parts) containing about 244 parts of di-para-nitrophenyl disulfide (and obtained by boiling para-nitrochlorbenzene with sodium sulfide and sulfur in aqueous alcohol, cooling and filtering the reaction mixture, washing the filter cake with water until free of water-soluble salts, and then drying), is added to an agitated mixture of 200 parts of 67% nitric acid, 1300 parts of 20° Bé. (31.45%) hydrochloric acid, and 400 parts of benzene in a reaction vessel equipped with a reflux condenser. (The reaction mixture contains about 2.7 mols of HNO₃ and about 14.1 mols of HCl per mol of di-para-nitrophenyl disulfide.) The temperature of the resulting slurry rises spontaneously to about 50° C. to 55° C. Chlorine gas is then passed rapidly into the mixture with continued agitation, the rate of introduction of chlorine being sufficient to cause a slight reflux of condensed vapors. The temperature of the reaction mixture is maintained at 50° C. to 55° C. during one-half hour, then raised to 62° C. to 65° C., and passage of chlorine through the mixture is continued at the latter temperature until all suspended solids have dissolved. The reaction is preferably continued for about an additional hour to insure its completion, the chlorine charged to the reaction amounting to about 350 parts. The mixture is then allowed to stratify and the upper layer, containing para-nitrobenzene sulfonyl chloride in solution in benzene, is separated from the lower aqueous acid layer.

*Part B.—Recovery of para-nitrobenzene sulfonyl chloride*

The benzene solution obtained according to Part A (above) is diluted with about twice its volume of a paraffinic petroleum oil fraction of A. P. I. gravity 74.4 at 15½° C., boiling at about 60° to 71° C. and essentially normal hexane. The mixture is cooled to 0° to 5° C. and held at this temperature for about one hour. Crystalline paranitrobenzene sulfonyl chloride, which separates from the solution, is filtered out and recrystallized from additional light petroleum distillate (hexane fraction). A yield of about 65% by weight, based on the di-para-nitrophenyl disulfide originally employed, is recovered.

EXAMPLE 2

The benzene solution obtained according to Example 1, Part A (above) is evaporated to remove about one-half of the benzene (e. g., about 200 parts by volume). The concentrated solution is then diluted with 500 parts of the light petroleum distillate (hexane fraction). The mixture is cooled to 0° to 5° C., agitated at this temperature for about 1 hour, and then filtered to obtain a filter cake of crude para-nitrobenzene sulfonyl chloride. The filter cake, together with 600 parts of light petroleum distillate, is placed in the extraction vessel of an apparatus for the continuous extraction of liquids which are heavier than the extraction solvent. (Such apparatus comprises essentially an extraction vessel connected by means of an overflow to a receiver, in which the extract can be heated to boiling temperature. The receiver is connected to a reflux condenser adapted to discharge its condensate into the extraction vessel, which is provided with means, e. g. a slow-moving agitator, to maintain circulation of the extraction solvent above the surface of the liquid to be extracted which forms a layer at the bottom of the extraction vessel.) The slurry of para-nitrobenzene sulfonyl chloride in the extraction vessel is heated sufficiently to maintain para-nitrobenzene sulfonyl chloride in a molten state so that it forms a liquid layer at the bottom of the vessel. 700 parts of light petroleum distillate (hexane fraction) are placed in the receiver and heated to boiling temperature, so that the vapors condensed by the reflux condenser flow into the extraction vessel, progressively dissolving the para-nitrobenzene sulfonyl chloride and carrying it through the overflow to the receiver. When a sample of the overflow liquid no longer yields crystals upon cooling to 30° to 35° C., the extraction is discontinued. The extract from the receiver is cooled to 0° to 5° C. and maintained at this temperature for about 2 hours. The resulting slurry of crystalline para-nitrobenzene sulfonyl chloride is filtered to recover the product in the form of a filter cake, and the latter is dried. Para-nitrobenzene sulfonyl chloride, obtained according to this procedure, has a melting point of 78° to 80° C. and can be recovered in a yield of about 70% of that possible theoretically, based on the di-para-nitrophenyl disulfide originally employed.

EXAMPLE 3

*Part A.—Preparation of para-nitrobenzene sulfonyl chloride*

Crude di-para-nitrophenyl disulfide (335 parts), containing about 268 parts of di-para-nitrophenyl disulfide, are mixed with 210 parts of 67% nitric acid, 1392 parts of 20° Bé. hydrochloric acid, and 440 parts of benzene. (The reaction mixture contains about 2.55 mols of $HNO_3$ and about 13.8 mols of HCl per mol of di-para-nitrophenyl disulfide.) Chlorine is passed into the agitated mixture at 62° to 64° C. for 6 hours, the amount of chlorine absorbed being about 240 parts by weight. The mixture is permitted to stratify and the upper, benzene layer is recovered separately from the lower aqueous acid layer.

*Part B.—Recovery of para-nitrobenzene sulfonyl chloride*

The benzene solution, constituting the upper layer of the reaction mixture of Part A (above), is evaporated until about 230 parts by volume of benzene have been removed. The resulting concentrated solution of para-nitrobenzene sulfonyl chloride is diluted with 800 parts by volume of (hexane fraction), cooled to 5° C., and agitated at this temperature for 3 hours.

The resulting slurry is filtered, and the filter cake, amounting to about 353 parts, is extracted in molten state with (hexane fraction) in the manner described in Example 2, above. Para-nitrobenzene sulfonyl chloride is recovered from the resulting extract, as described in Example 2, in a yield corresponding to about 78% of theory.

We claim:

1. A process for the manufacture of para-nitrobenzene sulfonyl chloride, which comprises reacting di-para-nitrophenyl disulfide with a mixture of aqueous nitric acid, chlorions, and a solvent for para-nitrobenzene sulfonyl chloride, which is liquid at the temperatures of the reaction and is further a member of the group consisting of aromatic hydrocarbons of the benzene series and paraffinic hydrocarbons containing 5 to 12 carbon atoms, nitro and chloro hydrocarbon derivatives of said hydrocarbons, and mixtures thereof.

2. A process for the manufacture of para-nitrobenzene sulfonyl chloride, which comprises reacting at a temperature substantially within the range 25° C. to 100° C. di-para-nitrophenyl disulfide with a mixture of aqueous nitric acid, chlorions, and a solvent for para-nitrobenzene sulfonyl chloride, which is liquid at the temperatures of the reaction and is further a member of the group consisting of aromatic hydrocarbons of the benzene series and paraffinic hydrocarbons containing 5 to 12 carbon atoms, nitro and chloro hydrocarbon derivatives of said hydrocarbons, and mixtures thereof, in amount sufficient to dissolve the para-nitrobenzene sulfonyl chloride formed but insufficient to dissolve a substantial proportion of the di-para-nitrophenyl disulfide.

3. A process for the manufacture of para-nitrobenzene sulfonyl chloride, which comprises reacting at a temperature substantially within the range 25° C. to 100° C. di-para-nitrophenyl disulfide with a mixture of aqueous nitric acid, chlorions, and benzene in amount sufficient to dissolve the para-nitrobenzene sulfonyl chloride formed but insufficient to dissolve a substantial proportion of the di-para-nitrophenyl disulfide.

4. A process for the manufacture of para-nitrobenzene sulfonyl chloride, which comprises reacting at a temperature between 50° C. and 65° C. di-para-nitrophenyl disulfide with a mixture of aqueous concentrated nitric acid, chlorions, and a solvent for para-nitrobenzene sulfonyl chloride, which is liquid at the temperatures of the reaction and is further a member of the group consisting of aromatic hydrocarbons of the benzene series and paraffinic hydrocarbons containing 5 to 12 carbon atoms, nitro and chloro hydrocarbon derivatives of said hydrocarbons, and mixtures thereof, in amount sufficient to dissolve the para-nitrobenzene sulfonyl chloride formed but insufficient to dissolve a substantial proportion of the di-para-nitrophenyl disulfide.

5. A process for the manufacture of para-nitrobenzene sulfonyl chloride which comprises passing chlorine into a reaction mixture comprising a suspension of di-para-nitrophenyl disulfide in a concentrated mixture of hydrochloric acid and nitric acid containing at least 1 mol of $HNO_3$ and at least 5 mols of HCl per mol of the disulfide, in the presence of at least 5 parts by weight of a liquid aromatic hydrocarbon of the benzene series for each 4 parts by weight of di-para-nitrophenyl disulfide.

6. A process for the manufacture of para-nitrobenzene sulfonyl chloride which comprises passing chlorine into a reaction mixture comprising di-para-nitrophenyl disulfide, concentrated nitric acid, concentrated hydrochloric acid, and a liquid aromatic hydrocarbon of the benzene series, said aromatic hydrocarbon being present in amount sufficient to dissolve the para-nitrobenzene sulfonyl chloride which is formed but insufficient to dissolve a substantial proportion of the di-para-nitrophenyl disulfide, at a temperature substantially within the range 25° C. to 100° C.

7. A process for the manufacture of para-nitrobenzene sulfonyl chloride which comprises passing chlorine into a reaction mixture comprising di-para-nitrophenyl disulfide, concentrated nitric acid, concentrated hydrochloric acid, and a liquid aromatic hydrocarbon of the benzene series, said aromatic hydrocarbon being present in amount sufficient to dissolve the para-nitrobenzene sulfonyl chloride which is formed but insufficient to dissolve a substantial proportion of the di-para-nitrophenyl disulfide, at a temperature between 50° C. and 65° C.

8. A process for the manufacture of para-nitrobenzene sulfonyl chloride which comprises passing chlorine into a reaction mixture comprising a suspension of di-para-nitrophenyl disulfide in a mixture of concentrated nitric acid and concentrated hydrochloric acid containing about two and two-thirds mols of $HNO_3$ and about fourteen mols of HCl per mol of the disulfide, and about one and two-thirds parts by weight of benzene per part by weight of di-para-nitrophenyl disulfide, at a temperature between 50° C. and 65° C. until substantially all of the di-para-nitrophenyl disulfide is reacted.

9. A process for the manufacture of para-nitrobenzene sulfonyl chloride which comprises passing chlorine into a reaction mixture containing di-para-nitrophenyl disulfide, concentrated nitric acid and concentrated hydrochloric acid, together with between five and twenty parts by weight of a liquid aromatic hydrocarbon of the benzene series for each four parts by weight of the di-para-nitrophenyl disulfide, separating the resulting aromatic hydrocarbon phase from the aqueous acid phase of the reaction mixture, diluting said aromatic hydrocarbon phase with at least twice its volume of a liquid paraffinic hydrocarbon, cooling the resulting mixture to effect crystallization of para-nitrobenzene sulfonyl chloride, and separating the crystalline product from the mixture.

10. A process for the manufacture of para-nitrobenzene sulfonyl chloride which comprises passing chlorine into a reaction mixture containing di-para-nitrophenyl disulfide, concentrated nitric acid and concentrated hydrochloric acid, together with a liquid aromatic hydrocarbon of the benzene series in amount sufficient to dissolve the para-nitrophenyl sulfonyl chloride but insufficient to dissolve a substantial proportion of the di-para-nitrophenyl disulfide, separating the resulting aromatic hydrocarbon phase from the aqueous acid phase of the reaction mixture, diluting said aromatic hydrocarbon phase with a volatile paraffinic hydrocarbon to effect precipitation of para-nitrobenzene sulfonyl chloride, separating the precipitated para-nitrobenzene sulfonyl chloride from the aromatic hydrocarbon liquid, extracting said para-nitrobenzene sulfonyl chloride with a volatile liquid paraffinic hydrocarbon, cooling the resulting extract to effect crystallization of para-nitrobenzene sulfonyl chloride, and separating the crystalline product from the extract.

11. A process for the manufacture of para-nitrobenzene sulfonyl chloride which comprises passing chlorine into a reaction mixture comprising a suspension of di-para-nitrophenyl disulfide in a mixture of concentrated hydrochloric acid and concentrated nitric acid containing at least one mol of $HNO_3$ and at least five mols of HCl per mol of the disulfide together with between five and twenty parts by weight of benzene for each four parts by weight of di-para-nitrophenyl disulfide, until substantially all of the di-para-nitrophenyl disulfide is reacted, separating the resulting benzene phase from the aqueous acid phase of the reaction mixture, and diluting said benzene phase with a sufficient amount of a petroleum distillate fraction boiling within the range 40° C. to 210° C. to effect precipitation of para-nitrobenzene sulfonyl chloride therefrom.

12. In the manufacture of para-nitrobenzene sulfonyl chloride by the splitting chlorination-oxidation of di-para-nitrophenyl disulfide, the improvement which comprises conducting the reaction in a mixture of aqueous concentrated hydrochloric and nitric acids and a solvent for para-nitrobenzene sulfonyl chloride, which is liquid at the temperatures of the reaction and is further a member of the group consisting of aromatic hydrocarbons of the benzene series and paraffinic hydrocarbons containing 5 to 12 carbon atoms, nitro and chloro hydrocarbon derivatives of said hydrocarbons, and mixtures thereof, in amount sufficient to dissolve the para-nitrobenzene sulfonyl chloride formed but insufficient to dissolve a substantial proportion of the di-para-nitrophenyl disulfide.

13. In the manufacture of para-nitrobenzene sulfonyl chloride by the splitting chlorination-oxidation of di-para-nitrophenyl disulfide, the improvement which comprises conducting the reaction in a mixture of aqueous concentrated hydrochloric and nitric acids, containing a mol ratio of $HNO_3$:HCl of about 1:5, and a solvent for para-nitrobenzene sulfonyl chloride, which is liquid at the temperatures of the reaction and is further a member of the group consisting of aromatic hydrocarbons of the benzene series and paraffinic hydrocarbons containing 5 to 12 carbon atoms, nitro and chloro hydrocarbon derivatives of said hydrocarbons, and mixtures thereof, in amount sufficient to dissolve the para-nitrobenzene sulfonyl chloride formed but insufficient to dissolve a substantial proportion of the di-para-nitrophenyl disulfide.

MICHAEL WITTE.
MORTON G. WELGE.

REFERENCES CITED

The following references are of record in the file of this patent:

UNITED STATES PATENTS

| Number | Name | Date |
|---|---|---|
| 2,277,325 | Heuter | Mar. 14, 1942 |

OTHER REFERENCES

Fierz: Helv. Chim. Acta, vol. 12, 1929, p. 667.
Bell: J. Chem. Soc. (London), 1928, p. 2776.